United States Patent Office

3,013,068
Patented Dec. 12, 1961

3,013,068
PRODUCTION OF ETHYLENIC COMPOUNDS FROM FREE RADICALS AND CUPRIC SALTS
Harold E. De La Mare, El Cerrito, Jay K. Kochi, Berkeley, and Frederick F. Rust, Orinda, Calif., assignors to Shell Oil Company, a corporation of Delaware
No Drawing. Filed June 30, 1958, Ser. No. 745,312
16 Claims. (Cl. 260—488)

This invention relates to a new method for producing compounds having an ethylenic double bond in the molecule. It deals with a method for producing such compounds by generating organic free radicals and abstracting hydrogen therefrom.

A great deal of work has been carried out on the generation of free radicals and their reactions. Decomposition of organic peroxides, for example, is a well known method for producing organic free radicals. Pyrolysis, photolysis and reaction with redox reducing agents are among the known methods producing organic free radicals from organic peroxides. Under the previously known methods of generating organic free radicals, the chief products obtained are those resulting from coupling of the radicals with themselves, or with the starting peroxide or other reactive compounds present in the reaction mixture. Smith patent, U.S. 2,820,813, for instance, describes the reactions which take place in the case of alpha-peroxy cyclic ethers. In this patent it is pointed out that one of the products may be an ethylenic compound corresponding to the organic free radical formed as intermediate in the reaction. Only very small proportions of such products are obtained in the prior methods of reaction, however.

It has now been discovered that by proper choice of the organic free radicals which are generated and by contacting the free radicals with cupric ions, ethylenic compounds can be obtained as the predominant products of the reaction. This is quite unexpected in view of the disclosure of U.S. Patent 2,828,338, in which it is indicated that saturated omega-hydroxy carboxylic acids are the products to be expected when reacting cyclic peroxides with redox reducing agents in the presence of compounds of metals in a higher valence state. However, the examples of the patent show only reactions with ferric sulfate as the source of the higher valent ion. Nothing in the patent suggests the possibility of obtaining ethylenic compounds as predominant products by using a cupric compound in the process.

It is essential for successful operation of the process that the organic free radicals which are generated have a hydrogen atom linked to a carbon atom which is directly attached to the carbon atom having the unpaired electron, i.e., there must be a hydrogen atom beta to the site of the free bond of the radical. Free radicals of the formula

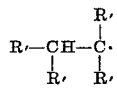

wherein the R,'s, which may be the same or different, represent hydrogen or organic radicals each having its free bond attached to a saturated carbon atom, are especially advantageous in the new reaction of the invention. Particularly preferred free radicals are those of the foregoing formula wherein the R,'s represent hydrogen or an organic group of 1 to 9 carbon atoms in which the free valence bond is attached to a carbon atom, especially hydrocarbon or carbonyl-substituted hydrocarbon groups which are free from ethylenic unsaturation.

The organic free radicals which are used in the new process can be generated in any desired way. Two advantageous known methods for generating organic free radicals are especially useful in producing free radicals having the required structure for use according to the invention. One is decomposition of organic peroxides advantageously by one of the methods previously referred to, namely pyrolysis, photolysis or reaction with a redox reducing agent. The other method is reaction of a peroxide with an organic compound having a removable hydrogen atom. Still other useful methods are decomposition of suitable azo and carbonyl compounds. Procedures for carrying out these reactions have been described in the literature.

The reaction of the invention when utilizing decomposition of an organic peroxide to generate the required organic free radical can be represented by the following general equations:

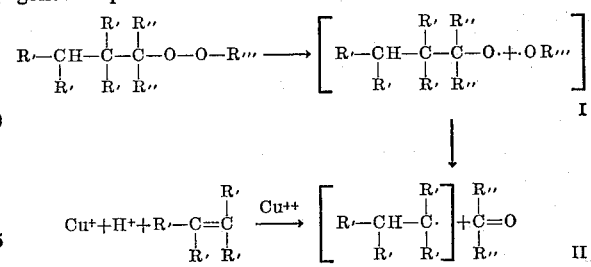

Here the R,'s have the previously indicated significance and the R,,'s represent hydrogen or organic radicals in which the free bonds may be attached to saturated or unsaturated carbon atoms or a radical of a polar group, for instance, a halo, hydroxyl, cyano, alkoxy, carboxy, carbalkoxy or like radical, preferably containing not more than about 10 and most preferably 1 to 4 carbon atoms. Any pair of R,'s or pair of R,,'s or any R, and R,, can together represent a divalent group in which the two free valence bonds are attached to the same or different carbon atoms. R,,, represents hydrogen or an organic group having its free bond linked to a carbon atom. The essential requirement of the starting peroxide is thus that the peroxy oxygen group be linked to a saturated carbon atom which is directly joined to another saturated carbon atom which is directly connected to another saturated carbon atom to which a hydrogen atom is directly attached. The over-all reaction of these peroxides is in accordance with the equation:

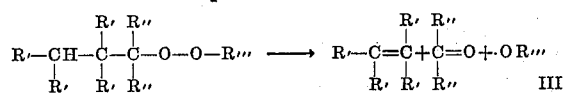

The type of ethylenic product which will be obtained will depend, of course, on the particular starting peroxide compound which is chosen for the reaction. When using peroxide compounds in which the R,'s monovalent hydrocarbon groups or in which two of the R,'s together form a divalent hydrocarbon group the product will be an open chain or cyclic ethylenic hydrocarbon, respectively. Typical of the reactions of this type are the conversion of 1,1-dimethylbutylhydroperoxide to propylene and acetone and the conversion of 1,1'-dicyclohexyldicyclohexyl peroxide to cyclohexene and cyclohexanone. When the starting peroxide compound is one having the peroxy oxygen group linked to a saturated carbon atom to which is directly joined a plurality of different groups each attached to said saturated carbon atom by a saturated carbon atom to which a hydrogen atom is directly linked, that is, the peroxide compound is one in which one or both of the R,, groups are

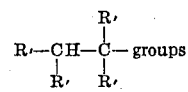

wherein one or more of the R,'s differ from those of the other such groups in the molecule, more than one ethylenic compound will be produced in the reaction. This is illustrated by the production of ethylene and cyclohexene when reacting 2-cyclohexyl-2-ethylperoxybutane according to the equations:

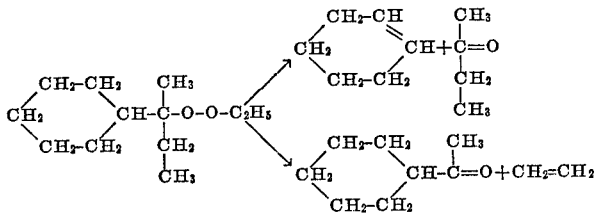

The proportions of the different ethylenic products which will be obtained from starting compounds capable of producing different intermediate free radicals will depend upon the structure of the peroxide used. Thus, for example, there is a greater tendency for hydrogen abstraction to take place from a tertiary carbon atom than from a secondary carbon while hydrogen is more readily removed from a secondary carbon atom than from a $CH_3$ group.

There are special advantages in carrying out the process of the invention with a peroxide compound of the previously described formula wherein an $R_{\prime}$ and an $R_{\prime\prime}$ together form a divalent group because in this way valuable ethylenic carbonyl compounds can be obtained. In this modification of the invention the reaction takes place according to the following equation in which Z represents a divalent group having its two free valence bonds attached to carbon:

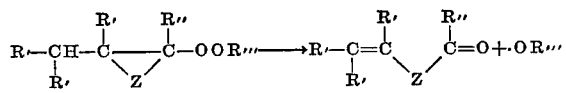

By this reaction 5- and 6-heptenal and 2-methyl-5-hexenal are produced from methylperoxy-2-methylcyclohexane, and 5-hexenone-2 is obtained from methylperoxy-1-methylcyclopentane, for instance.

While emphasis has been placed on starting peroxides of the indicated types in which the $R_{\prime}$'s, $R_{\prime\prime}$'s and $R_{\prime\prime\prime}$ are hydrogen or hydrocarbon groups and Z is a divalent hydrocarbon group, this has been for purposes of illustration only. Another species of useful starting peroxides are the alpha-peroxy cyclic ethers having 4 to 18 carbon atoms in the ring and not more than two oxygen atoms in the ring and having the peroxy group linked to a ring carbon atom which is directly attached to a carbon atom to which another carbon atom having a hydrogen atom directly linked thereto is attached which yield carboxylic acid esters of ethylenic alcohols when reacted with a redox reducing agent in the presence of a cupric salt soluble in the mixture in accordance with the invention. Not only can $R_{\prime\prime}$ represent a polar group, as previously pointed out, but also there may be polar groups such as hydroxyl, cyano, alkoxy, carboxy, halo, etc. attached to hydrocarbon radicals represented by $R_{\prime}$ and/or $R_{\prime\prime}$ and/or $R_{\prime\prime\prime}$. Examples of suitable substituted peroxides of these kinds are, for instance, bis(1,1-dimethyl-4-hydroxybutyl) peroxide which gives allyl alcohol and acetone as products, tert-butyl-3-cyano-tert-amyl peroxide which gives acrylonitrile and acetone, 2-hydroperoxy-3-pentyltetrahydropyran giving the formates of 3- and 4-nonene-1-ol, 1,1-bis (4-chlorobutylperoxy) 1-phenylethane giving allyl chloride and acetophenone, and tertiary butyl-4-amino-1,1-dimethylpentyl peroxide giving 3-aminobutene-1 and acetone.

There are special advantages in generating the organic free radicals required for the reaction by reaction of a redox reducing agent with an organic hydroperoxide or organic hydroperoxide precursor, especially a peracetal, hemiperacetal, perketal, hemiperketal or ozonide as hydroperoxide precursor. In this modification of the invention undesirable side reactions are more easily minimized and high yields of the desired products can be obtained economically. Thus a particular and preferred embodiment of the invention comprises reacting an organic hydroperoxide compound having the previously indicated structure, i.e., having the hydroperoxy group linked to a saturated carbon which is joined by a saturated carbon to a third saturated carbon atom to which a hydrogen atom is attached, under redox reaction conditions in the presence of a cupric compound to produce an ethylenic product.

Roedel patent, U.S. 2,601,223 describes a method of redox reaction of cyclic peroxides in which organic free radicals useful for the process of the invention, are formed as intermediates. In the method of the patent saturated dibasic carboxylic acids or their esters are produced by reacting hydroxy-cyclic peroxides or hydroperoxides or cyclic ether peroxides with a redox reducing agent. By carrying out the method of the patent in the presence of cupric ions the character of the reaction is drastically changed and the primary product is an ethylenic monocarboxylic acid or ester.

The peroxide compounds used are those having a cyclic structure consisting of from 4 to 10 carbon atoms in the primary ring. These and other useful peroxide compounds of this type are obtainable, for example, by oxidizing cyclic ketones of the formula

where R is a divalent group containing from 3 to 11 carbon atoms in the unsubstituted portion of the group using hydrogen peroxide as the oxidizing agent. Alternatively these peroxide starting compounds can be made by low-temperature oxidation, with air or oxygen, of the corresponding alcohol or of a cyclic secondary ether of the formula

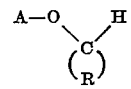

where R has the above-indicated significance and A is a hydrocarbon group, preferably an alkyl of 1 to 8 carbon atoms such as methyl, ethyl, butyl, octyl, etc. The resulting peroxide compounds are hydroperoxides or compounds which hydrolyze to hydroperoxides under the redox reaction conditions. Typical of these peroxides are, for instance, those of the formula

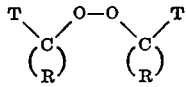

where T is a radical of the group consisting of hydroxyl, hydroperoxy, and alkoxy groups, preferably containing 1 to 8 carbon atoms, most preferably not more than 4 carbon atoms. R is a divalent group containing from 3 to 11 carbon atoms in the unsubstituted portion of the divalent group. With all these cyclic peroxide compounds the intermediate free radical is

or more explicitly

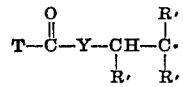

wherein T is one of the previously indicated radicals and Y is a bivalent group which when linked to

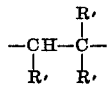

forms the bivalent group —R— in the starting cyclic compound as above described. From these intermediate radicals by the process of the invention one obtains ethylenic monocarboxylic acids as esters,

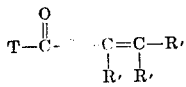

The process of the invention as carried out using redox reaction for decomposition of the starting peroxide compound to produce the required intermediate free radical can be advantageously practiced by intimately mixing the chosen peroxide compound with a redox reducing agent in the presence of cupric ions. Preferably the reaction is conducted in solution in a mutual solvent. Ferrous ion is a particularly useful redox reducing agent and can be introduced by adding ferrous sulfate or other soluble ferrous salt to the reaction mixture. The reducing agent or mixture of reducing agents used are employed in an amount equivalent to, or preferably in excess of, for instance, up to about 10% excess over, the stoichiometric requirement for reduction of the peroxide compound being reacted. A temperature of the order of about —15° C. to about 250° C., more preferably about 0° C. to about 150° C., is suitable for the reaction, which is usually complete in about 5 to about 240 minutes under these conditions.

The required cupric ions are advantageously introduced by adding a cupric salt which is soluble in the reaction mixture. Most preferably cupric salts of polybasic inorganic acids such as cupric sulfate, cupric perchlorate and the like are used, but cupric salts of monobasic inorganic acids or organic cupric salts can also be used. Cupric nitrate, and less desirably, cupric chloride because of its tendency to form chloro-substituted products in some cases, are examples of such other inorganic salts. Suitable organic cupric salts include, for example, cupric acetate, cupric perchlorobutyrate, cupric caprolate, etc. Only relatively small amounts of the cupric salt or mixture of cupric salts employed need be added. As a rule amounts such as will give about 0.1 to about 2 equivalents of cupric ion per mole of peroxide compound are most useful but larger or smaller amounts can also be used.

This modification of the invention is further illustrated by the following examples:

EXAMPLE I

*Production of ethylene and acetone from tertiary amyl hydroperoxide*

An aqueous solution of t-amyl hydroperoxide (5 grams) was added dropwise to a rapidly stirred deaerated aqueous solution of ferrous sulfate (5 grams) and cupric sulfate (10 grams) at 80° C. The gaseous product was collected and found by VPC analysis to be predominantly ethylene. The aqueous solution was analyzed for ethyl alcohol and acetone. The latter was present in 90% yield and no ethyl alcohol was found. The presence of approximately 5% t-amyl alcohol was estimated by vapor phase chromatographic analysis. In the absence of cupric sulfate, the gaseous product is predominantly ethane with small amounts of ethylene.

EXAMPLE II

*Production of 3-butenol from 2-tetrahydropyranyl hydroperoxide*

A solution of ferrous sulfate heptahydrate (33.4 grams, 0.12 mole) and cupric sulfate (19.2 grams, 0.12 mole), prepared by dissolving the salts in 120 ml. of water, was added to 2-tetrahydropyranyl hydroperoxide (12.6 grams of 93.3% purity, 0.10 mole; ≈100 ml. of water) at 25 to 45° C. The system was swept with nitrogen prior to the addition of metal ions. The mixture was then heated for two hours at 60°±10° C. Sulfuric acid (10 ml. of concentrated acid/100 ml. of water) was added and the solution warmed for several hours at 50 to 80° C. The reaction mixture was then distilled at 60 mm. until pure water was obtained at the head. The aqueous distillate was saturated with anhydrous potassium carbonate and 3.2 grams of organic material ($n_D^{20}$ 1.4193) was separated and analyzed by infrared and gas chromatography methods. The spectrum was consistent with principally 3-butenol plus a small amount of n-butanol (bromine number=1.27 moles/100 grams; theory for 3-butenol=1.39 moles/100 grams). On the basis of the bromine number, the yield of 3-butenol is 41%. This product resulted from the hydrolysis of the butenyl formate initially formed in the reaction.

EXAMPLE III

*Preparation of 5-hexenoic acid from cyclohexanone-hydrogen peroxide adduct*

Hydrogen peroxide (22.0 grams of 30.8% w., 0.20 mole) was added rapidly but dropwise to cyclohexanone (39.2 grams, 0.4 mole) in a 3-necked "creased side" 1-liter flask equipped with Tru-bore stirrer, dropping funnel and thermometer. This addition usually resulted in a temperature rise to ca. 35° C. After ≈45 minutes stirring, 1 ml. of 6 N sulfuric acid was added to the mixture and stirring continued for another fifteen minutes. The suspension was then cooled in an ice bath to 20° C., preswept with nitrogen, and a cupric-ferrous sulfate solution (100 grams $CuSO_4$—$5H_2O$, 0.4 mole, 111 grams $FeSO_4$—$7H_2O$, 0.4 mole; and 22 ml. of conc. $H_2SO_4$ in ≈400 ml. of water) was added as rapidly as temperature control (20–25° C.) would permit. The time of addition was usually less than five minutes. Vigorous stirring was continued for ≈2 hours at 20–30° C. and the reaction mixture was then diluted with a sulfuric acid solution (20 ml. of concentrated sulfuric acid in ≈230 ml. of water) and extracted thoroughly with chloroform. The extract was washed with two "25 ml." portions of saturated sodium chloride solution. The extract was dried, the chloroform removed by distillation and the residue distilled through a short Heli-pak column:

| Fraction | Weight, grams | Boiling Point, °C. | $n_D^{20.6}$ | Remarks |
|---|---|---|---|---|
| 1 | 21.4 | 46–47/23 mm | 1.4506 | Cyclohexanone (0.218 equiv.). |
| 2 | 2.0 | 89–106/21 mm | 1.4421 | ≈77% w. 5-hexenoic acid. |
| 3 | 6.7 | 107–109/21 mm | 1.4330 | } 5-hexenoic acid.[1] |
| 4 | 2.2 | 91–94/8 mm | 1.4339 | |
| Bottoms | 1.3 | | | Contains 0.0057 equiv. of acid. |
| Trap | 14.5 | | | Contains 0.015 equiv. |

[1] Lit. values: boiling point 107°/17 mm., 103°/12 mm.; $n_D^{20}$ 1.4343, $n_D^{30}$ 1.4337.

Fractions 2, 3 and 4 represent a yield of ≈0.1 mole of 5-hexenoic acid or ≈62% yield based on a conversion of 0.162 mole of cyclohexanone.

By using 3,3,5-trimethyl cyclohexanone in place of cyclohexanone in this reaction, 3,3,5-trimethyl-5-hexenoic acid is obtained in similar good yield.

EXAMPLE IV

*Production of 6-hepten-2-one from 1-methylcyclohexyl hydroperoxide*

Cupric sulfate (27.2 grams, 0.17 mole) in about 125 ml. of water was added to the 1-methylcyclohexyl hydroperoxide (15.5 grams of 69.7% purity, 0.08 mole) dissolved in 100 ml. of methanol. The resulting suspension was vigorously stirred and ferrous sulfate heptahydrate (47.3 grams, 0.17 mole; 70 ml. of water) solution was added as rapidly as possible while maintaining a temperature of 20–25° C. The mixture was stirred for two hours after the addition of the ferrous sulfate, and then diluted to 1 liter volume with water. This suspension was extracted with ether. The precipitated metal salts were dissolved by the addition of dilute sulfuric acid and the resulting solution was extracted with ether. The combined ether extracts were washed with dilute sodium bicarbonate solution and dried over anhydrous magnesium sulfate. After removing the bulk of the ether, the crude product was fractionated in a Piros-Glover spinning band column. Fractions 1 to 4 (boiling point 70–75°/54 mm.; $n_D^{20}$ 1.4244 to 1.4263; 7.8 grams) were analyzed by infrared spectroscopy and gas chromatography and shown to be principally 6-hepten-2-one. On the basis of the bromine number these fractions contained 0.0593 mole of 6-hepten-2-one (I).

Fractions 5 and 6 (boiling point 75–82° C./54 mm.; $n_D^{20}$ 1.4318 to 1.4502; 4.4 grams) were likewise analyzed by infrared and gas chromatography and shown to contain principally I and 1-methylcyclohexanol. On the basis of bromine number, these fractions contained 0.019 mole of I. Therefore, the total yield of I, 0.078 mole, was about 94% of theory based on the hydroperoxide reacted.

The 6-hepten-2-one was further identified by conversion to a 2,4-dinitrophenylhydrazine, melting point 75–76.5° C. (Found: 53.7% C, 5.5% H, 19.3% N; calculated for $C_{13}N_4O_4H_{16}$: 53.4% C, 5.5% H, 19.2% N). The melting point of this derivative was depressed by mixing with an authentic sample of the derivative prepared from the saturated analog, 2-heptanone.

EXAMPLE V

*Production of methyl 5-hexenoate from 1-methoxycyclohexyl hydroperoxide*

Hydrogen peroxide (22.0 grams of 30.6% purity, 0.2 mole) was added to cyclohexanone and the mixture stirred for about 1 hour. Methanol (≈300 ml.) containing 1 ml. of 6N$H_2SO_4$ was then added and the solution stirred for another fifteen minutes. A solution of cupric sulfate (100 grams of the pentahydrate, 0.40 mole) and ferrous sulfate (111.2 grams of the heptahydrate, 0.40 mole), prepared by dissolving the salts in 400 ml. of water-300 ml. of methanol, was added rapidly with vigorous stirring at 18–40° C. (most of the addition occurred at 18–25° C.). After stirring for about three hours, the mixture was diluted with 1500 ml. of water containing 20 grams of concentrated sulfuric acid. The product was extracted with chloroform, and the extract was washed with brine and dried over anhydrous magnesium sulfate. The chloroform was removed and 25.9 grams of product plus recovered cyclohexanone (boiling point 74°/54 mm., $n_D^{20}$ 1.4387–1.4398) was collected by fractional distillation. This material was found to have an ester content of 0.077 equivalent, and the bromine number was equivalent to a double bond content of 0.075 mole; the acid content of this material was nil. The infrared spectrum indicated methyl 5 - hexenoate (yield 39% based on $H_2O_2$). Additional acid and ester (0.014 and 0.033 respectively) were found in the column holdup and still bottoms, part of which was not unsaturated.

EXAMPLE VI

*Production of 1-hexene from heptyl aldehyde hemi peracetal*

Using the method of Example V but substituting a solution of equal moles of cupric acetate and ferrous sulfate for the cupric sulfate-ferrous sulfate solution, the heptyl aldehyde-hydrogen peroxide adduct

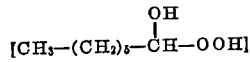

is reacted to obtain 1-hexene and formic acid as major products.

By reaction in the same way using ferrous lactate or other reducing agents such as other salts of polyvalent heavy metals in their lower valence state or sodium bisulfite or ascorbic acid, etc. as the redox reducing agent, together with the same or other cupric salts, the processes of the foregoing examples can be successfully carried out with other organic hydroperoxides or hydroperoxide precursors to produce other ethylenic compounds. Examples of such starting compounds are, for instance: 5-chloro - 2 - phenylpentane - 2 - hydroperoxide, which gives allyl chloride and acetophenone; 1-methyltetralin hydroperoxide, giving ortho-allyl acetophenone; 1-tetralin hydroperoxide, from which 2-allylbenzaldehyde and tetralone are obtained; 9-decalinhydroperoxide, giving 2 - (omega-butenyl) cyclohexanone and 5-cyclodecanenone; 8-hydroperoxyhexahydroindane, giving 4 - and 5 - cyclononenone; 2 - cyclohexene hydroperoxide, which gives 2,5-hexadienal. The hydroperoxides obtainable by oxidizing the hydrogenated xylenes are especially useful for the production of ethylenic ketones which are not otherwise readily available, particularly 6- and 7-octenone-2 from 1,2-dimethylcyclohexane hydroperoxide, 4- and 6-methyl-6-heptenone-2 from 1,3-dimethylcyclohexane hydroperoxide, and 5-methyl-6-heptenone-2 from 1,4-dimethylcyclohexane hydroperoxide. Aldehyde, ketone and aliphatic acid adducts of hydrogen peroxide are another group of suitable starting compounds, representative examples of which are 2-ethyl-1-hydroxyhexane hydroperoxide, an adduct of 2-ethyl hexyl aldehyde, which gives 2- and 3-heptene and formic acid in the reaction with ferrous and cupric salts; 3,7-dimethyl-1-hydroxy-6-octene hydroperoxide, an adduct of citronellal which gives 2,6-dimethyl-1,5-heptadiene and formic acid in the same reaction; the methyl isoamyl ketone - hydrogen peroxide adducts which give 3-methylbutene-1 and acetic acid as products of the redox reaction in the presence of cupric sulfate; the methyl cyclohexyl ketone adducts which give cyclohexene and acetic acid under the same conditions; and perbutyric acid, the adduct of hydrogen peroxide and butyric acid, which gives propylene and carbon dioxide by the method of the invention.

Another type of compound which can be reacted with redox reducing agents and a cupric salt as described above, to produce ethylenic products, is the adducts of aldehydes or ketones with alkyl hydroperoxides which have the hydroperoxide linked to a saturated carbon which is joined through another saturated carbon to a third saturated carbon atom to which a hydrogen atom is attached. These adducts are hydroperoxide precursors whose reaction according to the invention can be facilitated by addition of a small amount of a strong acid, preferably sulfuric or phosphoric acid or the like. Typical starting products of this kind are, for instance, acetaldehyde tert-amyl hemiperacetal or 1-hydroxy-1-tert-amyl peroxyethane, an adduct of acetaldehyde and tert-amylhydroperoxide which gives ethylene, acetone and acetaldehyde in the reaction; benzaldehyde diisoamyl peracetal or bis(isoamyl-peroxy) phenyl methane, an adduct of benzaldehyde and isoamyl hydroperoxide, which gives isobutylene, formaldehyde and benzaldehyde; acetone n-propyl hemiketal or 2-hydroxy-2-propylperoxypropane, an adduct of propyl hydroperoxide and acetone, which gives ethylene, formaldehyde and acetone; and acetophenone dilauryl ketal or 1,1-bis (lauryl peroxy)-1-phenylethane, an adduct of lauryl hydroperoxide and acetophenone giving 1-undecene, formaldehyde and acetophenone. Examples of ozonides which are hydroperoxide precursors and can be reacted similarly under redox conditions according to this modification of the invention are 5-hexenoic acid ozonide, which gives 3- butenoic acid, formic acid and formaldehyde according to the following equation:

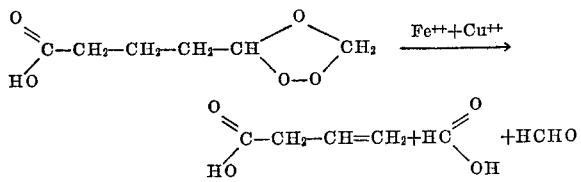

Oleic acid ozonide under similar conditions gives five main products, namely azelaic acid semialdehyde, 1-octene, 7-octenoic acid, nonylaldehyde and formic acid. The ozonide of cyclohexene under the same conditions gives 4-pentenal and formic acid.

As previously indicated, thermal decomposition of peroxide compounds of the structure described above is an alternative method which can be used to produce the intermediate organic free radicals essential to the new method of producing ethylenic compounds. Roedel Patent U.S. 2,601,224 describes a method of thermal reaction of peroxides of cyclic compounds which can be successfully employed since by reaction in the presence of cupric ions the method is changed into one for producing ethylenic ketones, monocarboxylic acids or esters, or nitriles, etc., instead of the difunctional compounds described in the patent.

Any of the peroxides described in the patent can be used as starting material for the production of ethylenic compounds according to the present invention. These peroxides are dicyclic peroxides in which a peroxide group (—O—O—) serves as a direct bridge between two cyclic structures, each containing from 4 to 10 carbon atoms in the primary ring and having at least one hydrogen atom attached to a saturated carbon atom which is joined by a saturated carbon atom to the saturated ring carbon atom to which the peroxide bridge is directly linked. Peroxides of the formula

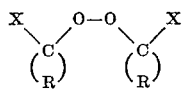

where X is a member of the group consisting of halogen, hydroxyl, cyano, phenyl, including alkyl-substituted phenyl groups, and alkoxy and alkyl groups containing no more than 4 carbon atoms. R is a divalent group of 3 to 9 carbon atoms of the previously described structure. The thermal decomposition of these peroxides by the method of the invention gives ethylenic carbonyl compounds according to the following equation:

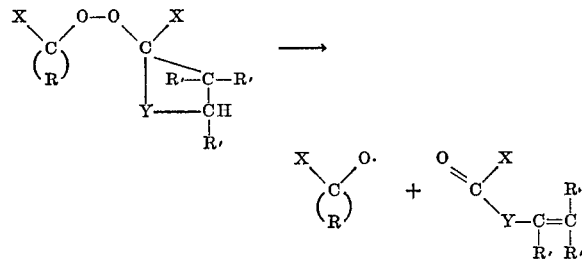

Instead of these peroxides any of the other peroxides or hydroperoxides previously discussed herein can be similarly reacted in the presence of a cupric salt to produce corresponding ethylenic compounds.

The thermal decomposition of the chosen starting peroxide compound or mixture of such compounds is advantageously effected by heating at a temperature in the range of about 75° to about 350° C. while maintaining at least a part of the reaction mixture in the liquid phase in the presence of a cupric compound. Reaction in the presence of cupric ions in an aqueous medium which is relatively inert to free radical attack is advantageous. The necessary cupric compound or mixture of cupric compounds is used in approximately the same amounts as are employed in the previously described redox reduction method of reaction.

The following examples illustrate the invention as carried out using pyrolysis of peroxides to generate the required free radicals:

EXAMPLE VII

*Production of ethylene and acetone from ditertiary amyl peroxide*

Ditertiary amyl peroxide (5 grams) was dissolved in 150 ml. of a 1 M solution of cupric perchlorate in 50% aqueous t-butanol. The peroxide solutions were put into glass bomb tubes, sealed and heated at 130° C. for 24 hours. The gas product was analyzed by vapor phase chromatography (VPC) and found to be exclusively ethylene. No ethane or methane was found. The aqueous solution was filtered to remove the precipitated particles of metallic copper. Qualitative analysis by VPC showed the presence of acetone but no methyl ethyl ketone. The absence of ethanol was indicated by a negative haloform reaction on the distilled products. Ethylene and acetone were found in 75% and 90% yields, respectively. Metallic copper was formed in 80% yield.

EXAMPLE VIII

*Production of 5-hexenoic acid from 1,1'-dihydroxy dicyclohexyl peroxide*

1,1'-dihydroxy dicyclohexyl peroxide made by reacting cyclohexanone and 30% hydrogen peroxide in a mole ratio of about 2:1 while cooling, decomposes by heating at about 130° C. in the presence of an aqueous tertiary butyl alcohol solution of cupric perchlorate as described in Example VII to give a good yield of 5-hexenoic acid which can be recovered by distillation as in Example III.

Other examples of compounds which can be reacted in the same way are ethyl-n-propyl peroxide or di-n-propyl peroxide, which give ethylene and formaldehyde; 1,4-dimethyl-1,4-dihydroperoxycyclohexane, which gives methyl vinyl ketone; and 1-isopropyl-4-methylcyclohexane hydroperoxide (obtainable from para-menthane, for example) giving 2,6-dimethyl-7-octeneone-3. Representative peracetals and hemiperacetals which can be similarly decomposed by heating in the presence of a cupric salt to obtain ethylenic products, are, for example: propionaldehyde tert-butyl hemiperacetal, which gives ethylene, formic acid and tert-butyl alcohol; isovaleraldehyde methyl hemiperacetal giving isobutylene; cyclopentane carboxaldehyde ethyl hemiperacetal, giving cyclopentene; glutaraldehyde monomethyl hemiperacetal giving 3-butenal and alpha-hydroxyadipaldehyde monoethyl hemiperacetal giving 2-hydroxy-5-pentenal. Perketals and hemiperketals which can likewise be reacted using cupric acetate or lactate as the cupric compound, for example, include, for instance, methyl isopropyl ketone diethyl peracetal from which acetic acid and propylene are obtained, methyl isobutyl ketone tert-butyl hemiperketal, giving isobutylene and acetic acid; cyclohexanone dimethyl perketal, giving 5-hexenoic acid; 1,1-bis(3-methyl-4-hydroxybutyl peroxy)-1-phenyl ethane, giving methallyl alcohol, formaldehyde and acetophenone. Among the ozonides which can be used as starting materials for the reaction under similar conditions are, for example, the ozonide of the 6-heptene-2-one of Example IV, which gives methyl allyl ketone as the chief product and the ozonide of 2-hexene giving propylene, formic acid and acetaldehyde.

Still another method of generating the organic free radicals necessary for the new process is photolysis by subjecting an organic peroxide or hydroperoxide compound of the previously indicated type or a suitable carbonyl or azo compound to ultraviolet light. The photolysis can be advantageously carried out as described in "Techniques of Organic Chemistry," edited by A. Weissberger, vol. II, p. 257 ff. In this modification of the invention one can, for example, conduct a liquid mixture, preferably an aqueous mixture, of the chosen starting organic peroxide, carbonyl or azo compound, together with a solution of a cupric salt through a quartz reaction tube which is exposed to ultraviolet radiation. The cupric salts are preferably introduced in about the same amounts as when using thermal decomposition of the peroxide compounds. A temperature of about −15° C. to about 250° C. can be employed.

The following examples illustrate these modifications of the invention:

EXAMPLE IX

*Production of ethylene and propionic acid from pentanone-3*

Ethyl radicals were generated in aqueous solution by the photolysis of pentanone-3. The source was the filament of a General Electric H100–A4 low-pressure mercury lamp. The material was contained in an evacuated cell equipped with a water-cooled lamp well. In the absence of cupric sulfate the gaseous product is mainly ethane. The addition of cupric sulfate drastically reduces the ethane production and causes a corresponding increase in the ethylene yield. The stoichiometry of the reaction can be determined from the amount of precipitated metallic copper formed in the oxidation. The ethylene yield based on the precipitated copper is 83%. A 90% yield of titratable carboxylic acid (propionic acid) is obtained.

This method of photolysis in the presence of a cupric compound can be successfully applied to the production of ethylenic compounds from other carbonyl compounds having linked to the carbonyl carbon atom a saturated carbon atom to which is linked another saturated carbon to which a hydrogen atom is directly attached, said two saturated carbon atoms being directly linked only to hydrogen and/or carbon atoms. In the photolysis, the bond linking the first of these saturated carbon atoms to the carbonyl carbon is ruptured and the resulting free radical containing the described saturated carbon atoms is converted under the influence of the cupric compound present into an ethylenic compound, as indicated in the Equation II on page 4. The simultaneously formed free radical containing the carbonyl carbon reacts in the conventional way to give a carbonyl compound. Other examples of carbonyl compounds which can be thus reacted are 4-methylheptanone-2, which gives tertiary amylene and propionic acid in aa aqueous medium; 2-ethylhexylaldehyde, which gives 2- and 3-heptene and methyl formate in methanol solution; and cyclohexanone, giving 5-hexenoic acid in aqueous solution.

As previously indicated, one can use azo compounds for the photolysis to form the free radicals required for the process of the invention. The same conditions can be used as in the photolysis of carbonyl compounds as above described. Thus azopropane, for example, is converted to propylene according to the equation:

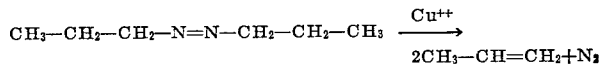

$$CH_3-CH_2-CH_2-N=N-CH_2-CH_2-CH_3 \xrightarrow{Cu^{++}} 2CH_3-CH=CH_2+N_2$$

In the same way any of the peroxides or hydroperoxides previously discussed can be subjected to photolysis to produce the indicated ethylenic products as illustrated by the production of ethylene and acetone from di-tert-amyl peroxide, for instance.

Another important method of carrying out the process of the invention makes use of reaction of a peroxide, advantageously hydrogen peroxide, or an organic peroxide such as tertiary butyl hydroperoxide or the like, with an organic compound to produce the organic free radicals which are the intermediates for the ethylenic products of the invention. In this method of operation the peroxide serves as a source of free radicals, for instance, hydroxyl free radicals or alkoxy free radicals, which abstract hydrogen from the starting organic compound and form the intermediate organic free radicals required. Here again either redox reaction or thermal decomposition can be used to produce the initial free radicals which effect the desired hydrogen abstraction. The reaction when using ferrous induced redox type decomposition to produce hydroxyl free radicals from hydrogen peroxide, can be represented by the following equations:

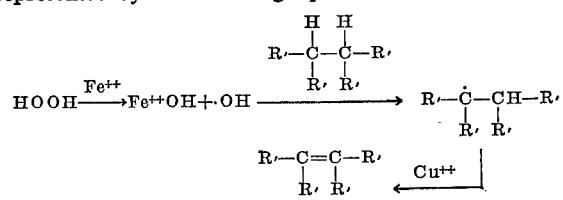

The organic compound used for this modification of the invention must be one which contains a hydrogen atom on each of two adjacent saturated carbon atoms whose other valences are taken up by hydrogen or carbon, as previously pointed out each $R'$ can be individually a hydrogen atom or hydrocarbon, for instance alkyl, or carbonyl-substituted hydrocarbon group, or two of these together can be a divalent hydrocarbon or carbonyl-substituted hydrocarbon group. Thus, for example, by the reaction of cumene with hydrogen peroxide in the presence of ferrous sulfate and cupric sulfate in the molar proportions of about 1:1:1:0.1, alpha-methylstyrene is produced.

The redox reduction, thermal decomposition or photolysis can be successfully conducted under the same conditions when reacting a peroxide with an organic compound as when using decomposition of the preformed organic peroxide compound as the source of the intermediate organic free radicals for the new reaction.

The following examples illustrate this modification of the invention:

EXAMPLE X

*Production of cyclohexene from cyclohexane and tert-butyl hydroperoxide*

Tert-butyl hydroperoxide (0.1 mole) was added to a benzene solution (≈250 ml.) of cupric caproate (≈0.076 mole) and ferrous caproate (≈0.085 mole) containing cyclohexane (42 grams, 0.5 mole). The addition was effected at 20–35° C. under a nitrogen blanket. The volatile organic materials were distilled off the metal-catalyst sludge and analyzed by gas chromatography. Cyclohexene was identified, and the bromine number indicated a yield of 0.013 mole (13% based on hydroperoxide).

EXAMPLE XI

*Production of cyclohexene from cyclohexane and hydrogen peroxide*

A solution of 56.4 grams (0.2 mole) ferrous sulfate heptahydrate and 50.3 grams (0.2 mole) cupric sulfate pentahydrate in about 350 ml. of water is added slowly so as to maintain the temperature between about 15° to about 25° C., to a mixture of 42 grams (0.5 mole) cyclohexane, 22.7 grams (0.2 mole) of 31% hydrogen peroxide and 350 ml. tertiary butyl alcohol. After stirring for about two hours the reaction mixture is diluted with about an equal volume of water and the organic phase is separated. Analysis shows production of cyclohexene in low yield.

Still other variations can be made in the process of the invention, which is not limited to the examples which have been given by way of illustration nor by any theory proposed in explanation of the new results which are obtained.

We claim as our invention:

1. A method for producing an ethylenic compound which comprises generating in the liquid phase a free radical having a hydrogen atom linked to a saturated carbon atom which is directly attached to a carbon atom having an unpaired electron in the presence of a soluble cupric salt.

2. A process in accordance with claim 1 wherein a free radical of the formula

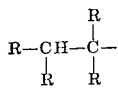

in which each R is a member of the group consisting of hydrogen hydrocarbon, and carbonyl-substituted hydrocarbon radicals of 1 to 9 carbon atoms each linked to the free radical by a bond attached to a saturated carbon atom, is contacted with a cupric salt of a strong polybasic inorganic acid.

3. A method for producing an ethylenic compound which comprises generating a free radical by substantially decomposing in the presence of a cupric salt soluble in the aqueous reaction mixture an organic peroxide compound in which there is linked to the peroxy group only groups consisting of hydrocarbon and halo, hydroxyl, cyano, alkoxy, carboxy and carbalkoxy-substituted hydrocarbon having 1 to 10 carbon atoms having a hydrogen atom linked to a saturated carbon atom to which is directly attached a carbon atom to which the peroxy oxygen group is directly joined and thereby forming a compound having an ethylenic double bond introduced at said saturated carbon atom.

4. A process in accordance with claim 3 wherein the decomposition of the organic peroxide compound is effected by redox reduction.

5. A process in accordance with claim 3 wherein the decomposition of the organic peroxide compound is effected by heating at a temperature of about 75° C. to about 350° C.

6. A process in accordance with claim 3 wherein the decomposition of the organic peroxide compound is effected by photolysis.

7. A process for producing an ethylenic hydrocarbon and a ketone which comprises treating an aliphatic peroxide compound having attached to the peroxy oxygen group a tertiary carbon atom to which is linked only saturated hydrocarbon groups, at least one of which is an alkyl radical containing a hydrogen atom in beta position to the carbon to which the free bond of the radical is attached, with a redox reducing agent in the presence of an added cupric salt which is soluble in the reaction mixture.

8. A process in accordance with claim 7 wherein an olefin and acetone are produced from a tertiary alkyl peroxide compound having from 5 to 10 carbon atoms in said tertiary alkyl group and two methyl groups directly linked to the carbon atom to which the peroxide oxygen is attached using ferrous sulfate as the redox reducing agent and cupric sulfate.

9. A process for producing an ethylenic monocarboxylic acid which comprises treating a peroxide compound having a cyclic structure consisting of from 4 to 10 carbon atoms in the ring to which the peroxy group is attached, said peroxide being obtainable by reacting together hydrogen peroxide and a cyclic ketone of the formula

where R is a divalent radical containing from 3 to 9 carbon atoms in the divalent chain, with a redox reducing agent in the presence of a cupric salt soluble in the reaction mixture.

10. A process in accordance with claim 9 wherein hexene-5-oic acid is produced by treating cyclohexanone peroxide with ferrous sulfate and cupric sulfate.

11. A process which comprises heating, at a temperature above its decomposition temperature, in the absence of oxygen, and in the presence of a reaction medium inert to free radical attack, a dicyclic peroxide compound containing two cyclic structures, each of which contains from 4 to 10 carbon atoms in the ring to which the peroxy group is attached, said cyclic structures being directly united to each other through an oxygen-oxygen bridge and containing on the same cyclic carbon atoms as the peroxygen linkage a polar group in the presence of cupric ions, and separating from the resulting reaction mixture a straight chain monofunctional monoethylenic compound containing one-half the number of carbon atoms as the original dicyclic peroxide compound and in which the polar group is the same as the polar group in said original peroxide compound.

12. A process for producing an ethylenic compound which comprises exposing to ultraviolet light a mixture of an organic peroxide compound having a hydrogen atom linked to a saturated carbon atom to which is directly attached a carbon atom to which the peroxy oxygen group is directly joined in an aqueous medium and contacting the free radical which is thus formed with a cupric salt present in an amount between about 0.1 and about 2 moles per mole of said peroxide compound.

13. A process for producing an ethylenic hydrocarbon which comprises treating a mixture of a peroxide, a hydrocarbon of the formula $$R'-CH-CH-R'$$
$$\quad\;\; |\quad\;\; |$$
$$\quad\;\; R'\quad R'$$

wherein the R.'s are members of the group consisting of hydrogen, alkyl radicals and divalent hydrocarbon radicals, said divalent hydrocarbon radicals representing two R.'s in the formuula, a redox reducing agent and a cupric salt soluble in the reaction mixture.

14. A process in accordance with claim 13 wherein cyclohexene is produced from cyclohexane, hydrogen peroxide, ferrous sulfate and cupric sulfate.

15. A process for producing a formic acid ester of an ethylenic alcohol which comprises contacting an alpha-peroxy cyclic ether having 4 to 18 carbon atoms and not more than two oxygen atoms in the ring and having the peroxy group linked to a ring carbon atom to which is directly attached a hydrogen atom and a carbon atom to which another carbon atom having a hydrogen atom directly linked thereto is attached with a redox reducing agent in the presence of a cupric salt soluble in the mixture.

16. A process in accordance with claim 15 wherein a tetrahydropyran peroxide is reacted with ferrous sulfate and cupric sulfate.

References Cited in the file of this patent

UNITED STATES PATENTS

| | | |
|---|---|---|
| 2,581,402 | Fryling | Jan. 8, 1952 |
| 2,584,773 | Reynolds et al. | Feb. 5, 1952 |
| 2,601,224 | Roedel | June 24, 1952 |
| 2,664,448 | Lorand et al. | Dec. 29, 1953 |
| 2,665,272 | Reynolds et al. | Jan. 5, 1954 |
| 2,820,813 | Smith | Jan. 21, 1958 |
| 2,820,832 | Berneis | Jan. 21, 1958 |
| 2,905,712 | Braunwarth et al. | Sept. 22, 1959 |

OTHER REFERENCES

Hawkins: J. Chem. Soc. (London) 1950, 2169–2173.
Boozer et al.: J. Am. Chem. Soc. 78, 1506–1507 (1956).
Tobolosky et al.: "Organic Peroxides," 1054, pp. 66–72 and 95–102.
Kharasch et al.: J. Org. Chem. 18, 322–327 (1953).